Sept. 27, 1966   BUNZO HIRANO   3,275,113
CLUTCH
Original Filed Sept. 9, 1963
Fig. 1
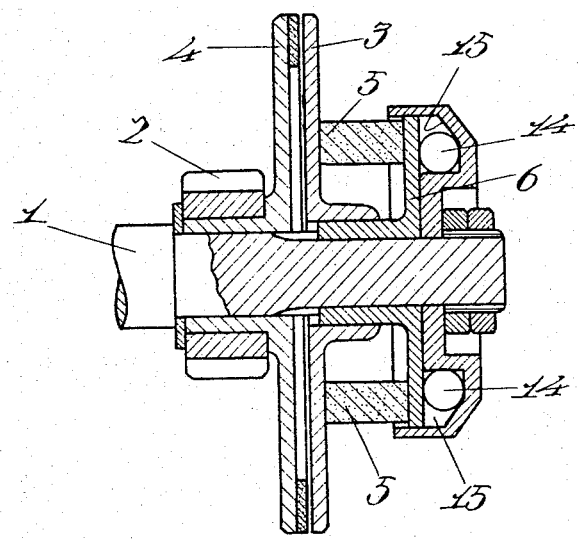
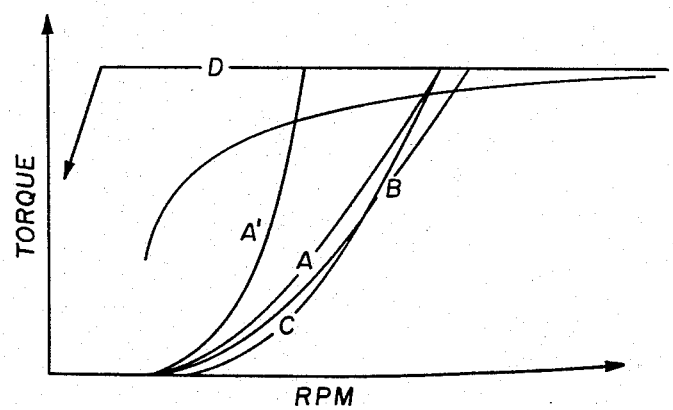
Fig. 2
INVENTOR
BUNZO HIRANO
BY
ATTORNEY

United States Patent Office

3,275,113
Patented Sept. 27, 1966

3,275,113
CLUTCH
Bunzo Hirano, 539 Nishinoshima, Toyotamura,
Iwata-gun, Shizuoka, Japan
Original application Sept. 9, 1963, Ser. No. 307,681.
Divided and this application Oct. 19, 1965, Ser. No. 510,726
6 Claims. (Cl. 192—52)

This application is a division of application Serial Number 307,681, filed September 9, 1963.

Typical of automatic clutches, specifically for automobiles, is a centrifugal friction clutch which depends on the number of revolutions of the engine. As the output of the engine is substantially proportional to the number of revolutions of the engine, a torque proportional to the output will be transmitted. Therefore, such centrifugal friction clutch seems to be reasonable. However, as the clutch is engaged at the same constant output or number of revolutions of the engine even in starting the car under a large load or on an upgrade as in starting it on a flat road, the output will be so short as to stop the engine. As the clutch is engaged at the time of a constant even in a quick start requiring a high output, the engine will be accelerated after the engagement of the clutch and therefore naturally the output will be short. Said centrifugal friction clutch can not be said to be perfectly adapted to such case that the acceleration and load always fluctuate.

An object of the present invention is to provide an automatic clutch wherein the load resistance and acceleration resistance on a driven shaft are detected independently of the number of revolutions of the engine and are made to act to properly reduce the amount of the torque transmitted by the clutch increasing with the number of revolutions of the engine so that, after the engine is accerated so much that the output will be restricted by the resistance of the driven shaft, the car may be always started quickly or upgrade with the high output under the conditions best adapted to the situation.

The present invention shall be described with reference to the drawings in which:

FIGURE 1 is a vertically sectioned side view of a clutch of the present invention utilizing the relation between the shearing stress and compressive stress of elastic bodies;

FIGURE 2 is a diagram for explaining the operation.

In FIGURE 1, 1 is a driving shaft, 2 is a driven gear and 3 and 4 are driving and driven friction plates, respectively. One of them, for example, the driving friction plate 3 is movable in the axial direction and is combined with a driving disk to borne integrally rotatably and axially slidably on a driving shaft in several places divided on a concentric circle with such elastic bodies 5 as rubber rods of a proper length on the back. The driven friction plate 4 is fixed to the driven gear 2.

14 is a centrifugal ball. With the rotation of the driving shaft 1, said centrifugal balls 14 will rotate and will apply their axial components to the driving friction plate 3 through the elastic bodies 5 due to the inclined or abutment surface 15.

A torque corresponding to the pressing force will be transmitted between both friction plates 3 and 4. Therefore, the rotation of the driving disk 6 will rotate the driving friction plate 3 through the elastic bodies 5 and will be transmitted to the driven friction plate 4. Now, if there is a resistance on the driven gear side, a shearing stress corresponding to the resistance will be naturally produced in the elastic bodies. In such case, the shearing stress will act to reduce the compressive stress and therefore the pressing force of the friction clutch will reduce or the transmitted torque will decrease. In response to the magnitude of the resistance applied to the friction shaft, the degree of reduction of the amount of the torque transmitted by the clutch will fluctuate. The ratio of the reduction of the transmitted amount of the torque to the magnitude of the resistance can be freely designed by the shape and size of the elastic bodies 5. Needless to say, even in a form in which the driving shaft and driven shaft are interchanged with each other, the action will be the same.

As the clutch is such, it will act the same as a centrifugal force clutch which depends on the number of revolutions of the engine. However, the compressive stress of the elastic bodies will gradually increase, at the same time the shearing stress will also tend to increase under the constant load on the driven side and the increase of the pressing force with their balance will be a little different from the increase of the torque transmitted by the centrifugal clutch. That is to say, it is shown by the curve A representing the relation of the capacity of the clutch with the number of revolutions of the driving shaft in the diagram in FIGURE 2. (The curve A' is of an ordinary centrifugal clutch.) It shows the operating characteristics of the clutch of the present invention.

On the basis of this characteristics curve A, the clutch will act. It is the load resistance and acceleration resistance that vary the action of the clutch. The load resistance will fluctuate with the carried load and the gradient of the runway. When the load resistance is high, the characteristics curve will be slow, that is to say, the number of revolutions will shift to be such at which the increase of the capacity of the clutch will be a little higher than at a low load. The degree of the shift will be determined entirely by the magnitude of the load resistance. (See the curve B in FIGURE 2.) The car can be accelerated where the engine output is that much high. The acceleration resistance will fluctuate with the time of applying the centrifugal force or the pressing force. This relates to the feed of gasoline and is a problem of the intention of the driver. When the throttle grip is rotated quickly, the acceleration resistance on the driven side will be so high that the number of revolutions of the driving shaft in engaging the clutch will be as high as in the case of the above mentioned load resistance and therefore the car will start quickly. (This is shown by the curve C in FIGURE 2.) The number of revolutions of the driving shaft for the same clutch capacity should be considerably higher as compared with the curve A. Even when the car is running at a fixed speed with the clutch fully engaged, if the engine is accelerated quickly, in the conventional clutch, the acceleration will be with all the load on the driven side but, in the present clutch, the reduction of the clutch capacity with the action of the above mentioned basic clutch by the acceleration resistance will be seen, therefore the engine will accelerate the car under the high output after the quick acceleration with the low load and the accelerating effect will be high. At the time of reducing the speed, the clutch will remain substantially fully engaged until the number of revolutions becomes considerably lower than in engaging the clutch and therefore it will be possible to use the engine brake as different from the case of the conventional centrifugal clutch. (See the curve D in FIGURE 2.)

As described above, the present clutch will be most effective when utilized specifically in the case that the output varies in response to the number of revolutions of the engine such as of an automobile, the acceleration and deceleration are always made and the condition of the load always varies. There will be made such gradual start (represented by the curve A in FIGURE 2) mostly by the utilization of the centrifugal force wherein, in starting on an ordinary flat road, the clutch will be engaged at any required number of revolutions of the engine and, with the increase of the number of revolutions, the torque capacity will be gradually increased. Thus, the relation of the increase of the number of revolutions of the engine in which the clutch capacity will increase in starting under a large load or on an upgrade will take place at a little higher number of revolutions (higher output) of the engine in response to the condition of the load. Therefore, the engine will not stop on the way. In quickly starting the car, if the engine is quickly accelerated, the clutch will be engaged at a number of revolutions higher than in ordinary starting and will then so operate that the clutch capacity may quickly increase. Therefore, the car will be accelerated as intended by the driver. In accelerating the car during the operation at a fixed speed, the clutch capacity will first reduce and the engine will be quickly accelerated under a low load and then will be connected gradually. Therefore, the acceleratability is high. Under the full load, the acceleration of the engine will be hardly as intended. However, in the present clutch, the driven shaft will be accelerated under the high output under which the engine has been accelerated. In shifting the transmission gears, even if the once released clutch is quickly connected, it will be naturally gradually engaged. (See the characteristics in FIGURE 2.) Therefore, the operative connection to the transmission gear is easy.

It can be simply provided that, when the torque is reversely transmitted from the driven side to the driving side, the friction plates will be pressed that much. Therefore, even at a number of revolutions at which the centrifugal force is of a capacity at or below semi-clutching, the clutch will be fully engaged. Therefore, it is easy to make engine braking, kick-starting or push-starting (in motor cycles). As soon as the brake pedal is trodden, the clutch will be disengaged. When the engine brake is unnecessary, that is to say, when the engine side is transmitting a torque to the rear wheels, as soon as the rotation of the engine reduces, the clutch will be again fully engaged and the engine brake will be applied. Thus, the operation is quite flexible. The present invention is therefore an automatic clutch which performs all actions no less ideally than any manual operation.

What I claim is:

1. A clutch comprising a driving member, a driven member, means mounting said members for rotation about a common axis and for limited relative translation along said axis to vary the effective axial thrust between said members, a driving disc rotatable about said axis, an elastic body connecting said driving disc and driving member for rotation as a unit and for limited relative angular movement about said axis in response to deformation of said elastic body, and proportional to torque applied to said driving disc, said deformation acting to decrease the effective thrust between said members, and means responsive to rotational speed of said driving disc and effective to urge the same axially toward said driving member with a force proportional to said rotational speed, and correspondingly increase the thrust between said members, through said elastic body.

2. The clutch of claim 1, said last-named means comprising a weight rotatable about said axis in unison with said driving disc and moveable radially outwardly thereof in response to increase in rotational speed, an abutment member rotatable as a unit with said disc and weight, said disc and abutment member having confronting surfaces engaged by said weight and coacting therewith to urge said disc toward said driving member in response to radially outward movement of said weight.

3. The clutch of claim 1, said elastic body being made of rubber.

4. A clutch comprising a rotatable driving shaft, a driven member journaled coaxially with said shaft for independent rotation, a driving member mounted on said shaft for translation relatively thereto along the axis of said shaft, to engage said driven member with variable force, a driving disc connected with said shaft for rotation as a unit therewith and for translation along said axis relatively thereto, at least one elastic body connecting said driving member and said driving disc for rotation as a unit and for limited relative angular movement about said shaft, said elastic body being deformed to decrease the effective axial force between said driving and driven members, by and in response to the torque applied to said driving member through said driving disc and body, and means responsive to rotational speed of said shaft and applying an axial thrust to said disc and thereby to said driving member, through said elastic body, said thrust being proportional to said rotational speed.

5. A clutch comprising a rotatable driving shaft, a driven friction plate journaled on said shaft for independent rotation about the axis thereof, a driving friction plate mounted on said shaft for limited translation relatively thereto along said axis to engage said driven plate with variable force, a driving disc connected with said shaft for rotation as a unit therewith and for translation along said axis relatively thereto, elastic means connecting said driving plate and said driving disc radially outwardly of said axis for rotation as a unit and for limited relative angular movement about said axis, said elastic means being deformed to decrease the axial force between said plates, by and in response to the torque applied to said driving plate through said driving disc and body, and means responsive to rotational speed of said shaft and effective to apply an axial thrust to said disc and thereby to said driving plate through said elastic body, proportional to said rotational speed.

6. The clutch of claim 5, said last-named means comprising an abutment member fixed with said shaft for rotation as a unit therewith, and having an internal frusto-conical surface inclined radially outwardly toward said disc, and a plurality of balls between and in contact with said surface and disc.

References Cited by the Examiner

UNITED STATES PATENTS

| | | | |
|---|---|---|---|
| 2,665,790 | 1/1954 | Birbaum | 192—105 |
| 2,721,639 | 10/1955 | Miller | 192—54 |
| 3,034,625 | 5/1962 | Grote | 192—55 X |

FOREIGN PATENTS 464,201   4/1937   Great Britain.

DAVID J. WILLIAMOWSKY, *Primary Examiner.*

A. T. McKEON, *Assistant Examiner.*